US008935187B2

(12) United States Patent
Higgins, Sr. et al.

(10) Patent No.: US 8,935,187 B2
(45) Date of Patent: Jan. 13, 2015

(54) DISTRIBUTED PAYMENT SYSTEM AND METHOD

(75) Inventors: Kevin L. Higgins, Sr., Mason, OH (US); Andrew Magruder, Loveland, OH (US)

(73) Assignee: Playspan, Inc., San Francisco, CA (US)

( * ) Notice: Subject to any disclaimer, the term of this patent is extended or adjusted under 35 U.S.C. 154(b) by 1666 days.

(21) Appl. No.: 12/042,555

(22) Filed: Mar. 5, 2008

(65) Prior Publication Data

US 2008/0222048 A1     Sep. 11, 2008

Related U.S. Application Data

(60) Provisional application No. 60/905,560, filed on Mar. 7, 2007.

(51) Int. Cl.
| G06Q 20/00 | (2012.01) |
| G06Q 20/40 | (2012.01) |
| G06Q 20/12 | (2012.01) |
| G06Q 20/20 | (2012.01) |
| G06Q 20/32 | (2012.01) |
| G06Q 20/36 | (2012.01) |
| G06Q 20/38 | (2012.01) |
| G06Q 20/42 | (2012.01) |

(Continued)

(52) U.S. Cl.
CPC ............. *G06Q 20/40* (2013.01); *G06Q 20/12* (2013.01); *G06Q 20/20* (2013.01); *G06Q 20/32* (2013.01); *G06Q 20/3276* (2013.01); *G06Q 20/3674* (2013.01); *G06Q 20/3823* (2013.01); *G06Q 20/387* (2013.01); *G06Q 20/4014* (2013.01); *G06Q 20/425* (2013.01); *G06Q 40/02* (2013.01); *G07G 1/14* (2013.01); *H04L 9/32* (2013.01)

USPC .......................................................... 705/76

(58) Field of Classification Search
USPC ........ 705/76, 16, 21, 26, 59, 71; 380/44, 262, 380/278, 279
See application file for complete search history.

(56) References Cited

U.S. PATENT DOCUMENTS 4,386,266 A * 5/1983 Chesarek ...................... 705/72
5,898,777 A    4/1999 Tycksen, Jr. et al.

(Continued)

FOREIGN PATENT DOCUMENTS

EP     1109138 A2     6/2001
JP     2005-135309    5/2005

(Continued)

OTHER PUBLICATIONS

U.S. Appl. No. 60/982,682, filed Oct. 25, 2007, 29 pages.

*Primary Examiner* — Dante Ravetti
(74) *Attorney, Agent, or Firm* — Kilpatrick Townsend & Stockton LLP

(57) ABSTRACT

The present invention provides a payment system that allows a mobile communications device (MCD) to interact with a merchant processing device (MPD) and a payment engine. A communications component associated with the payment engine can send requested barcodes to the MPD, receive barcodes or alphanumeric Universal Product Codes from customer MCDs, and handle payment authorizations and settlements. A barcode management component can generate and interpret barcodes based upon merchant offerings and client requests. A security algorithms component can employ an offset pair algorithm to convert each digit from a payment card information into an offset pair of digits to facilitate security in accordance with one embodiment of the present invention.

17 Claims, 4 Drawing Sheets

(51) Int. Cl.
*G06Q 40/02* (2012.01)
*G07G 1/14* (2006.01)
*H04L 9/32* (2006.01)

(56) References Cited

U.S. PATENT DOCUMENTS

| | | |
|---|---|---|
| 6,125,352 A | 9/2000 | Franklin et al. |
| 6,330,544 B1 | 12/2001 | Walker et al. |
| 6,609,113 B1 | 8/2003 | O'Leary et al. |
| 6,704,714 B1 | 3/2004 | O'Leary et al. |
| 6,993,573 B2 | 1/2006 | Hunter |
| 7,031,733 B2 | 4/2006 | Alminana et al. |
| 7,076,329 B1 | 7/2006 | Kolls |
| 7,124,937 B2 | 10/2006 | Myers et al. |
| 7,127,264 B2 | 10/2006 | Hronek et al. |
| 7,136,841 B2 | 11/2006 | Cook |
| 7,152,780 B2 | 12/2006 | Gauthier et al. |
| 7,245,905 B2 | 7/2007 | Kamdar et al. |
| 7,251,495 B2 | 7/2007 | Keyani et al. |
| 7,567,934 B2 | 7/2009 | Flitcroft et al. |
| 7,571,141 B2 | 8/2009 | Haung et al. |
| 7,580,898 B2 | 8/2009 | Brown et al. |
| 7,584,153 B2 | 9/2009 | Brown et al. |
| 7,611,054 B2 | 11/2009 | Bortolin et al. |
| 7,654,451 B2 | 2/2010 | Bortolin et al. |
| 7,706,838 B2 * | 4/2010 | Atsmon et al. ............... 455/558 |
| 7,707,120 B2 | 4/2010 | Dominguez et al. |
| 7,958,052 B2 | 6/2011 | Powell |
| 2001/0034222 A1 | 10/2001 | Roustaei et al. |
| 2001/0034717 A1 | 10/2001 | Whitworth |
| 2001/0037264 A1 | 11/2001 | Husemann et al. |
| 2002/0038289 A1 * | 3/2002 | Lawlor et al. .................. 705/42 |
| 2002/0174121 A1 | 11/2002 | Clemie |
| 2003/0028481 A1 | 2/2003 | Flitcroft et al. |
| 2003/0065615 A1 | 4/2003 | Aschir |
| 2003/0139174 A1 | 7/2003 | Rao |
| 2003/0171993 A1 | 9/2003 | Chappuis |
| 2003/0194071 A1 | 10/2003 | Ramian |
| 2003/0200184 A1 | 10/2003 | Dominguez et al. |
| 2003/0212601 A1 | 11/2003 | Silva et al. |
| 2004/0019564 A1 | 1/2004 | Goldthwaite et al. |
| 2004/0044621 A1 | 3/2004 | Huang et al. |
| 2004/0048025 A1 | 3/2004 | Lohnes |
| 2004/0214597 A1 | 10/2004 | Suryanarayanna et al. |
| 2005/0029358 A1 * | 2/2005 | Mankins ................ 235/462.46 |
| 2005/0033653 A1 * | 2/2005 | Eisenberg et al. .............. 705/26 |
| 2005/0125301 A1 | 6/2005 | Muni |
| 2005/0131826 A1 | 6/2005 | Cook |
| 2005/0144020 A1 | 6/2005 | Muzaffar et al. |
| 2005/0203854 A1 | 9/2005 | Das et al. |
| 2005/0211771 A1 | 9/2005 | Onozu |
| 2005/0222767 A1 | 10/2005 | Odamura |
| 2005/0238149 A1 | 10/2005 | De Leon |
| 2005/0240526 A1 | 10/2005 | Hill |
| 2005/0252966 A1 | 11/2005 | Kulas |
| 2006/0006226 A1 | 1/2006 | Fitzgerald et al. |
| 2006/0080232 A1 | 4/2006 | Epps |
| 2006/0138219 A1 | 6/2006 | Brzezniak et al. |
| 2006/0149644 A1 | 7/2006 | Sulmar et al. |
| 2006/0163345 A1 | 7/2006 | Myers et al. |
| 2006/0178986 A1 * | 8/2006 | Giordano et al. .............. 705/40 |
| 2006/0253339 A1 | 11/2006 | Singh et al. |
| 2007/0051797 A1 | 3/2007 | Randolph-Wall et al. |
| 2007/0063017 A1 | 3/2007 | Chen et al. |
| 2007/0078759 A1 | 4/2007 | Lilly et al. |
| 2007/0094085 A1 | 4/2007 | Redmond et al. |
| 2007/0094135 A1 | 4/2007 | Moore et al. |
| 2007/0100651 A1 | 5/2007 | Ramer et al. |
| 2007/0106564 A1 | 5/2007 | Matotek et al. |
| 2007/0136211 A1 | 6/2007 | Brown et al. |
| 2007/0203836 A1 | 8/2007 | Dodin |
| 2007/0208671 A1 | 9/2007 | Brown et al. |
| 2007/0213991 A1 | 9/2007 | Bramante |
| 2007/0233615 A1 | 10/2007 | Tumminaro |
| 2007/0241183 A1 | 10/2007 | Brown et al. |
| 2007/0255620 A1 | 11/2007 | Tumminaro et al. |
| 2007/0255652 A1 | 11/2007 | Tumminaro et al. |
| 2007/0255653 A1 | 11/2007 | Tumminaro et al. |
| 2007/0255662 A1 * | 11/2007 | Tumminaro ................... 705/79 |
| 2007/0282756 A1 * | 12/2007 | Dravenstott et al. ........... 705/72 |
| 2008/0033793 A1 | 2/2008 | Roberts |
| 2008/0040276 A1 | 2/2008 | Hammad et al. |
| 2008/0048025 A1 | 2/2008 | Fitzgerald et al. |
| 2008/0228611 A1 | 9/2008 | Lilly et al. |
| 2009/0006262 A1 | 1/2009 | Brown et al. |
| 2009/0112768 A1 | 4/2009 | Hammad et al. |

FOREIGN PATENT DOCUMENTS

| | | |
|---|---|---|
| WO | WO 97/45814 A1 | 12/1997 |
| WO | WO 01/71627 A2 | 9/2001 |

* cited by examiner

DISTRIBUTED PAYMENT SYSTEM AND METHOD

CROSS-REFERENCE TO RELATED APPLICATIONS

The present invention claims the benefit under 35 U.S.C. §119(e) of U.S. provisional patent application No. 60/905,560, filed Mar. 7, 2007 and entitled "Distributed Payment System and Method," the disclosure of which is hereby incorporated by reference in its entirety.

FIELD OF THE INVENTION

The present invention relates to a distributed system and method for handling payments in commercial transactions.

BACKGROUND AND SUMMARY

The advent of mobile communications devices (MCDs) such as cellular telephones has enabled telecommunication in a wide variety of environments previously not contemplated. MCDs have decreased in cost to become more common than conventional land-line telephones. Thus, the MCD is commonly seen in stores, malls, public squares, sporting events, and has become ubiquitous.

MCDs have also evolved to host somewhat related technologies, such as digital cameras, scanners, text messaging, and computer supported internet browsing and email access, for example. All these nascent technologies have thus become available to users in a variety of conventional day-to-day environments. Some have contemplated applications for use of mobile phones in a commercial environment, including effectuating commercial transactions; however, most of these concepts require additional hardware and/or software for the consumer and/or the merchant.

In Japan, some mobile phones now include computer software that enables the telephone to capture and read quick response (QR) matrix codes. This computer software may be bundled with the phone, programmed into the phone by the customer, or purchased as third party commercial software. An individual may then use the mobile phone to take a picture of or capture the QR code, decode it, and transmit the code and user's digital information to a remote system as a request for marketing materials to be sent to the user. This is primarily a one-way or uni-directional transaction with respect to digital information and does not extend beyond the registration of the request and the response of providing the marketing materials to the potential consumer; there is currently no provision for a payment system. QR matrix codes are also used in inventory management, transportation, etc., subject to a Japanese industry standard. Denso Wave, Inc., of Tokyo, Japan, is a commercial provider of software using the QR codes, and more information may be found at http://www.denso-wave.com/qrcode/app-prod-e.html.

PayPal™ mobile is a one-way text-only payment system commercially available through Paypal of San Jose, Calif., and is capable of being hosted on mobile phones. A user may send a text message from their MCD designating a monetary amount and requesting a transaction with another party, using their telephone number or email account. Along with the monetary amount and designated type of transaction, the user must provide a personal identification number for confirmation of the transaction. As noted above, the PayPal™ mobile system is uni-directional, text-only and does not use graphic images to convey data about a transaction. Upon submission of a transaction request, a PayPal operator will call the user to confirm the transaction. Thus, this system is not real-time or completely automated (see https://www.paypal.com/cgibin/webscr?cmd=xpt/cps/mobile/MobileOverview-outside).

Obopay™ is a mobile phone system, offered commercially by Obopay, Inc. of Redwood City, Calif., that enables certain transactions using money held in an "Obopay account" at a bank designated by Obopay™. The transactions include sending or receiving money between Obopay accounts and management of an Obopay™ Prepaid MasterCard®. The system generally relies on proprietary software for full functionality; the proprietary Obopay™ software must be installed on the mobile phone, making it inaccessible or difficult for most users, and some mobile phones do not support the technology. The Obopay™ system can also use SMS ("Short Messaging Service" or "Simple Messaging Service") messaging or mobile phone internet access; however, users without the Obopay™ software must use web access (i.e., wap.obopay.com) from their mobile phone or non-graphic SMS text messaging. Commercial transactions are contemplated as relying on use of the prepaid credit card and not by direct mobile phone communication.

Other proposals have contemplated including the mobile phone in steps such as scanning bar codes (e.g., the universal product code), generating bar codes, decoding bar codes, communicating with merchant hosted communication systems (e.g., blue tooth, infra red), etc. A common drawback with these proposals is the requirement for additional hardware and/or software for the consumer's mobile phone and/or the merchant's point of sale (POS) technology. For example, conventional (i.e., off the shelf mobile phones may be able to photograph and capture images, but they currently are unable to scan and decode universal product codes. Further, some of these systems require multiple interfaces that complicate the digital information flow. Of course, such requirements would complicate implementation and slow the development of a standard system.

Unfortunately, there is not available a secure, global, two-way payment system that relies on off-the-shelf mobile phones, is capable of accepting either graphics or text to complete a transaction, does not require additional software and/or hardware to be loaded onto the mobile phone or the merchant's POS technology, does not require a secure network, provides for out-of-channel two-factor authentication of the transaction by the consumer and does not require the merchant to receive payment directly from the customer at the point of purchase.

By providing such a system and method, the present invention thereby benefits a variety of entities including, for example, online digital content publishing/sales entities, offline unattended kiosks, and offline small-to-medium sized entities (SMEs) where real-time credit card authentication is not practical for the merchant.

The present invention is a distributed system and method for handling payment in commercial transactions. The present invention uses existing, common technologies already in widespread, global use to implement a bi-directional flow of digital information to enable commercial transactions. Further, the present invention does not require additional software/hardware to be installed on user's mobile telephones.

Of course, a two-way system supporting bi-directional transactions will present security challenges greater than the single-way systems. The configuration of the present invention preferentially provides a secure two way flow of information. Two-factor authentication (originating cell phone and personal identification number (PIN)), for example, may provide consumer fraud protection greater than or equal to Verified-by-Visa or MasterCard SPA, while maintaining an easily used interface for the mobile phone user, making it ideal for teens and young adults.

In one aspect, the present invention provides a distributed payment system that relies on the mobile phone keypad, the mobile phone camera, and SMS messaging technology. This system enables payment, online or offline, for transactions with minimal key entry on the mobile phone keypad by using the camera phone and SMS capabilities, respectively, to capture and transmit images of bar codes displayed by the vendor. The transaction is communicated using globally-accepted, consistent technologies and protocols, which renders the payment system independent of the mobile phone carrier and accessible to global consumers. The payment system can be accepted by merchants anywhere in the world that mobile camera phones are used, or any environment having Internet connectivity. The payment system travels over common, non-premium wireless protocols, providing the basis for the low-cost transactions critical for micro- and small-payment support, as well as for rapid merchant adoption. While the present invention does not require it, the present invention can operate with MCDs that implement additional or substitute software and hardware functionality, such as, for example, barcode scanning technology. In such an embodiment, the MCD can scan codes from paper or electronic interfaces in order to acquire the code for later processing as detailed herein or, where acceptable capture of the bar-code is problematic, accept text entry of the alphanumeric universal product code.

DETAILED DESCRIPTION OF THE PREFERRED EMBODIMENTS

Figure 1:
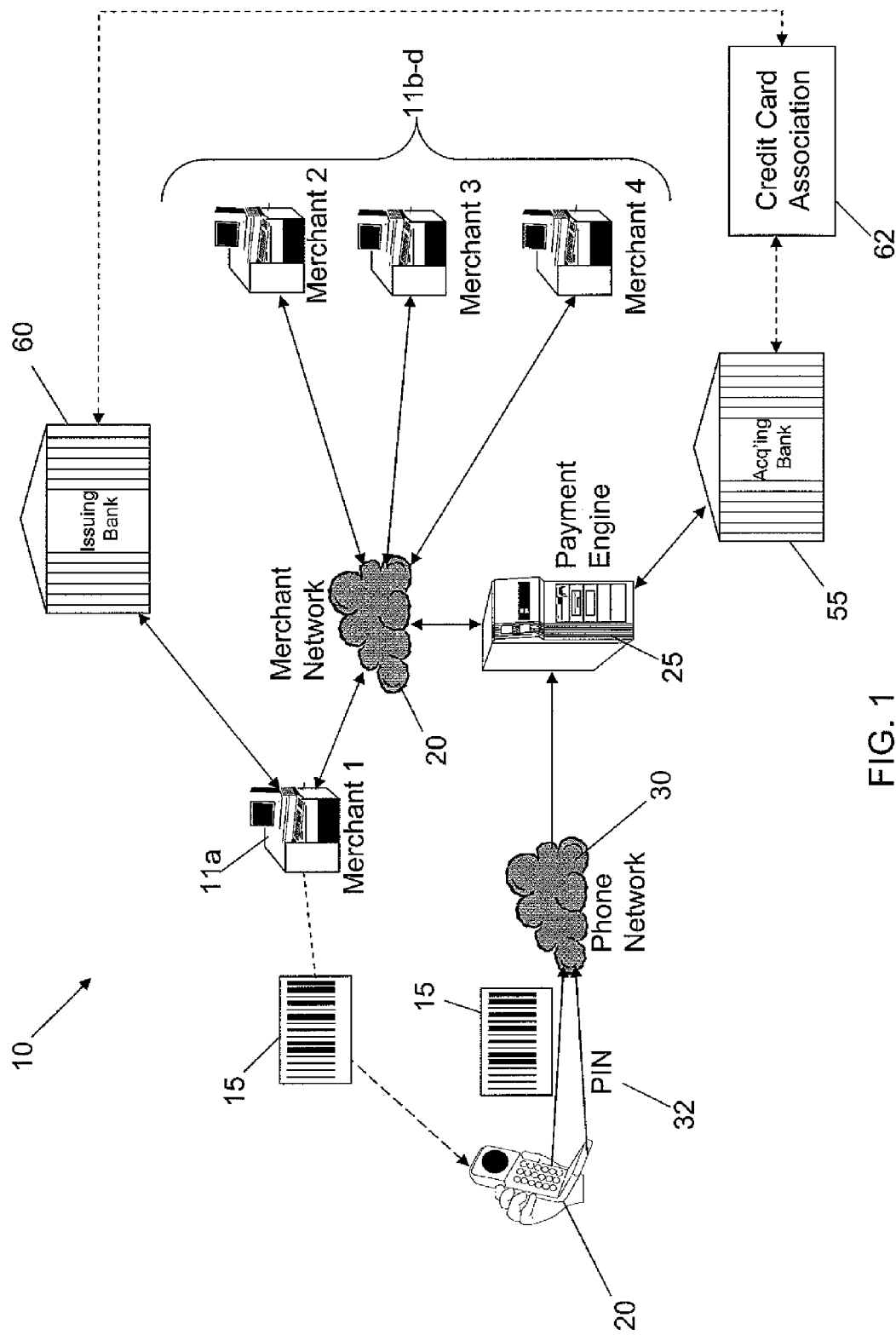
FIG. 1 is a schematic diagram illustrating a sample system architecture for use in connection with one embodiment of the present invention.

As shown in FIG. 1, the present invention provides a payment system 10 that allows a mobile communication device (MCD) 20 to interact with a merchant processing device (MPD) 11a and a payment engine 25. In one embodiment of the present invention, the MCD is an off-the-shelf device with no additional software installed. The merchant device 11a communicates with the payment engine 25 through merchant network 20, which can optionally be a secure network accessible over the Internet. It will be appreciated that other merchants 11b-d can also access payment engine 25 through the merchant network 20.

Figure 2:
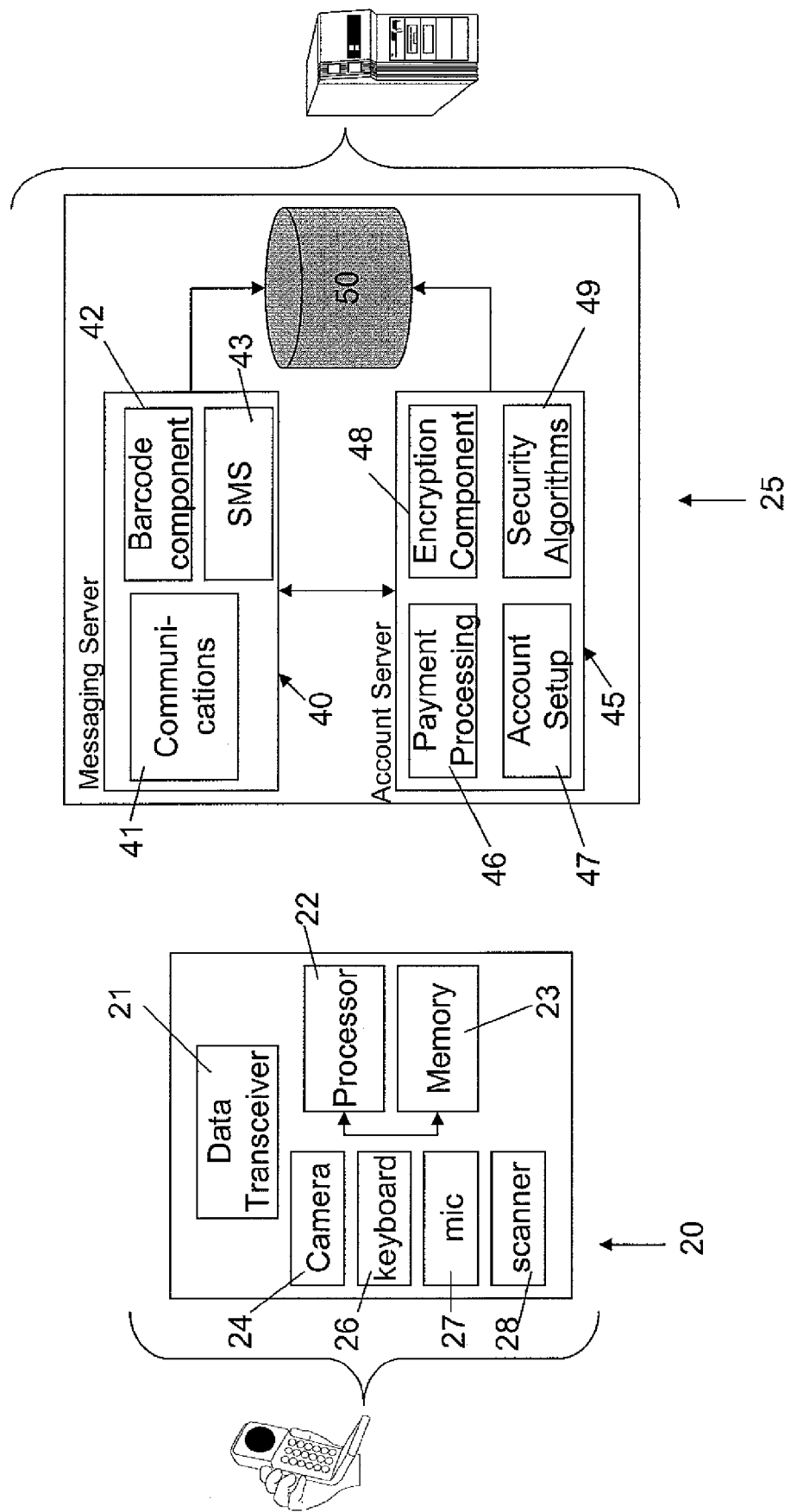
FIG. 2 are schematic diagrams of the wireless communication device and payment system according to one embodiment of the present invention.

As shown in FIG. 2, the payment engine 25 employs a messaging server 40 and an account server 45 to accommodate merchant payment and account configurations, merchant commercial offerings, customer payment and account configurations, and customer orders in accordance with the present invention. The payment engine messaging server 40 includes a communications component 41, a barcode management component 42 and an SMS interface 43. The account server 45 comprises a payment processing component 46, an account setup component 47, an encryption component 48 and a security algorithms component 49.

The communications component 41 allows the payment engine 25 to communicate with MPDs and MCDs, among other entities, devices or systems. In one embodiment of the present invention, the communications component can send requested barcodes to the merchant device, receive barcodes from customers, send data to payment system storage devices 50, send data to credit card processors (i.e., associations) 62 and initiate credit settlements as shown in FIG. 1. The barcode component 42 can be a commercially available barcode software program that can interpret barcodes based upon merchant offerings and client requests, for example. The SMS interface 43 provides for special communication processing of Simple Messaging Service (a.k.a., Short Messaging Service) messages. While not shown, the messaging server and the account server and their respective components are driven by a CPU with sufficient memory to quickly process the necessary computer instructions to carry out the functions discussed herein in real-time.

The account setup component 47 of the account server 45 allows the merchant to register its vending device(s) and configure its account and payment procedures. When the account server is registered and acknowledged by the system of the present invention, further vendor communications can occur as described more completely hereinafter.

The account setup component further allows the customer to configure his or her account and payment procedures. In one embodiment of the present invention, the customer can configure an account through account setup component such that the customer deposits funds with the payment engine or its operator, whereupon the funds are stored and available for later commercial transactions. The customer can also configure an account to use a credit or debit card issued by customer's financial institution, whereupon the payment engine categorizes the account as one that must provide for approvals, communications and authorizations in credit and debit transactions. Such transactions involve processing the flow of information ("approval/authorization") and settlement of finds via communications with an acquiring bank 55, an association 62 (e.g., MasterCard™ or VISA™), and an issuing bank 60, as illustrated in FIG. 1. Such processes and settlement are known to those of ordinary skill in the art.

The present invention contemplates that customers using the present invention in the course of traditional credit or debit transactions have opened a credit or debit account with a bank ("issuing bank") that is a member of the association and received a credit and/or debit card as a result, or they have created and pre-paid funds into an account maintained by the system, from which purchase amounts may be deducted. The present invention further contemplates that merchants using the present invention have entered into a relationship with a bank (the "acquiring bank") that is a member of the same association as the issuing bank. The acquiring bank facilitates the approval/authorization process and settlement on behalf of the merchant.

As the present invention operates such that the customer does not provide credit information directly to the merchant, the present invention varies somewhat from ordinary information and settlement processing, and such differences are expressed herein. Following the transfer of account information from the purchaser to the payment engine, the payment processing component 46 of the present invention seeks approval of the transaction by providing account information to the merchant's acquiring bank along with the purchase price of the merchant's offering. The acquiring bank sends the information to the association, and the association passes the information to the issuing bank. The issuing bank uses the information to determine whether to approve the transaction. Assuming that the issuing bank authorizes the transaction, a record of authorization to consummate the transaction is sent from the issuing bank to the association. The record of authorization typically includes a unique identification code. The association sends the authorization to the acquiring bank, and the acquiring bank sends the authorization to the payment processing component of the payment engine.

Upon receipt of the authorization in the offline, interactive transaction example, the payment processing component can inform the merchant, who in turn may provide the purchaser with the goods or services that are the subject of the transaction with the assurance that the merchant will receive the proceeds of the transaction upon settlement. The system can handle online transactions similarly by informing the merchant of completion of payment. In handling offline, automated transactions, the payment processing component of the present invention can deliver a message to the MCD with information necessary for the customer to claim the item or service purchased. This offline, automated approach can work in the unattended kiosk embodiment of the present invention, for example.

Settlement of the transaction and ultimate payment to the merchant can be handled according to conventional procedures. For example, the association can institute settlement by clearing the acquiring bank's request for payment with an offsetting demand on the issuing bank. Upon settlement, the association pays the acquiring bank the amount of the sale less the issuing bank domestic interchange fee and less an association fee. To complete the cycle, the issuing bank then bills the purchaser for the amount of the sale. The purchaser may then pay the issuing bank in accordance with its credit agreement with the issuing bank.

In handling stored value accounts, the payment processing component 46 uses the information provided by the user to determine if the user has sufficient proceeds (e.g., identified in database 50) to cover payment for the desired transaction. Settlement can occur according to the terms of any agreement between a payment system provider and a user.

The security algorithms component 49 communicates with the account setup component 47 to convert any payment card information (e.g., debit card digits, credit card digits, expiration date digits, card verification method (CVM) digits, PIN digits) into an appropriately secure code for use with the present invention. In one embodiment of the present invention, the security algorithms component employs an offset pair algorithm to convert each digit from the payment card information into an offset pair of digits using whole numbers. Table 1 below illustrates an example of offset pairs corresponding to a credit card having digits 2222 1111 8888 and a CVM of 901 using a PIN of 8675309. The offset pairs can be derived by the algorithm component randomly selecting a PIN digit (e.g., the first digit, the fourth digit, etc.) and setting the first value of the offset pair to be the sequence number of the PIN (e.g., the first digit has a sequence number of "1" because it is first in the sequence, the second digit has a sequence number of "2" because it is second in the sequence, etc.). The second value of the offset pair is then derived by taking the value of the credit card digit (e.g., a "2" is the first digit in the hypothetical credit card number below) and determining what must be subtracted from the "2" to obtain the value of the PIN digit corresponding to the first offset pair value. For example, if the first offset pair value is "4" then the fourth digit of the PIN has a value of "5". The credit card digit value "2" is thus derived by subtracting "−3" from the "5" value. Mathematically, this is represented as 2−(−3)=5. The offset pair is thus stored as (4, −3) and indicates that the given digit value of the credit card is derived by subtracting (−3) from the fourth digit of the PIN.

The offset pair values can be different even if the credit card digit value is the same. For example, as shown in Table 1, the value of the first four digits of the credit card is "2" yet the first digit value of the offset pair is different in each case. Since this first digit value of the offset pair is determined randomly, it is possible that it could be the same even if the credit card digit value is the same. In one embodiment of the present invention, every number of the payment card is derived from the customer's PIN, using random algorithms to determine which value of the PIN is used to derive each of the numbers in the customer's credit card. For payment system accounts secured by the customer's bank account, the bank account MICR is derived the same way.

TABLE 1

| Credit card digit | CVM digit | PIN | Offset Pair |
|---|---|---|---|
| 2 | | 8675309 | 4, −3 |
| 2 | | 8675309 | 2, −4 |
| 2 | | 8675309 | 6, 2 |
| 2 | | 8675309 | 7, −7 |
| 1 | | 8675309 | 1, −7 |
| 1 | | 8675309 | 2, −5 |
| 1 | | 8675309 | 7, −8 |
| 1 | | 8675309 | 6, 1 |
| 8 | | 8675309 | 4, 3 |
| 8 | | 8675309 | 1, 0 |
| 8 | | 8675309 | 5, 5 |
| 8 | | 8675309 | 3, 1 |
| | 9 | 8675309 | 2, 3 |
| | 0 | 8675309 | 3, −7 |
| | 1 | 8675309 | 4, −4 |

By operating with offset pairs or another code created by an algorithm using the present invention, the payment system of the present invention avoids storage of user credit card numbers, PINs, CVMs and any other direct payment account information. In this way, risk of compromise of such information is drastically reduced and PCI compliance is ensured. The CVM is a usually three- or four-digit number used by major credit card companies to verify the card holder has the physical card in hand when making a transaction outside of a traditional point-of-sale environment. According to one embodiment of the present invention, the CVM information is either derived from the customer's PIN, just as the credit card itself is, using offset pairs, or it is provided by the customer in real-time, such as by appending the correct CVM value to their PIN, for example. The present invention can thereby work to process credit information on the fly as transactions are occurring using only a PIN (or PIN+CVM) provided by the customer at the time of transacting. The system will not process a transaction if the credit card gateway through which the transaction is run returns a CVM failure indicating the CVM is incorrect for that credit card.

In the embodiment of the present invention where the use chooses to use a stored value account with the payment system of the present invention, as opposed to using a credit card or debit card, the present invention can still use offset pairs as described above to conceal a user's payment authorization code. Alternatively, the customer can use a stored value code that does not require storage of an authorization code; instead, the customer simply provides his or her PIN at the time of transacting. The PIN can be provided by speaking or keying it into the user's MCD, for example.

The encryption component 48 can be used to encrypt each user's PIN as well as the offset pairs, so that the system of the present invention never stores a user's actual PIN or offset pairs. In one embodiment of the present invention, a non-reversible hash of the PIN and each offset pair is created prior to encryption by the security algorithms component for added security.

In operation, and with reference to FIG. 1, the merchant device 11a can procure a barcode 15 from the barcode management component of the payment engine 25 according to an offering or package of offerings to be made available to a customer. For instance, a ticket kiosk can provide customers with ticket offerings to multiple events at a single kiosk. In one embodiment of the present invention, the ticket kiosk owner and/or manager (or another entity in control of the tickets), can identify pre-packaged tickets (e.g., 2 tickets to Ultimate Fighter™ bouts, a set of season tickets to every local college track event, a selected grouping of tickets to a concert series (e.g., a 5-concert pack)) for acquisition using the payment engine 25. Alternatively, the customer can make selections at the point and time of purchase, whereupon the merchant device notifies the payment engine of the customer selection for barcode generation on-the-fly.

Figure 3:
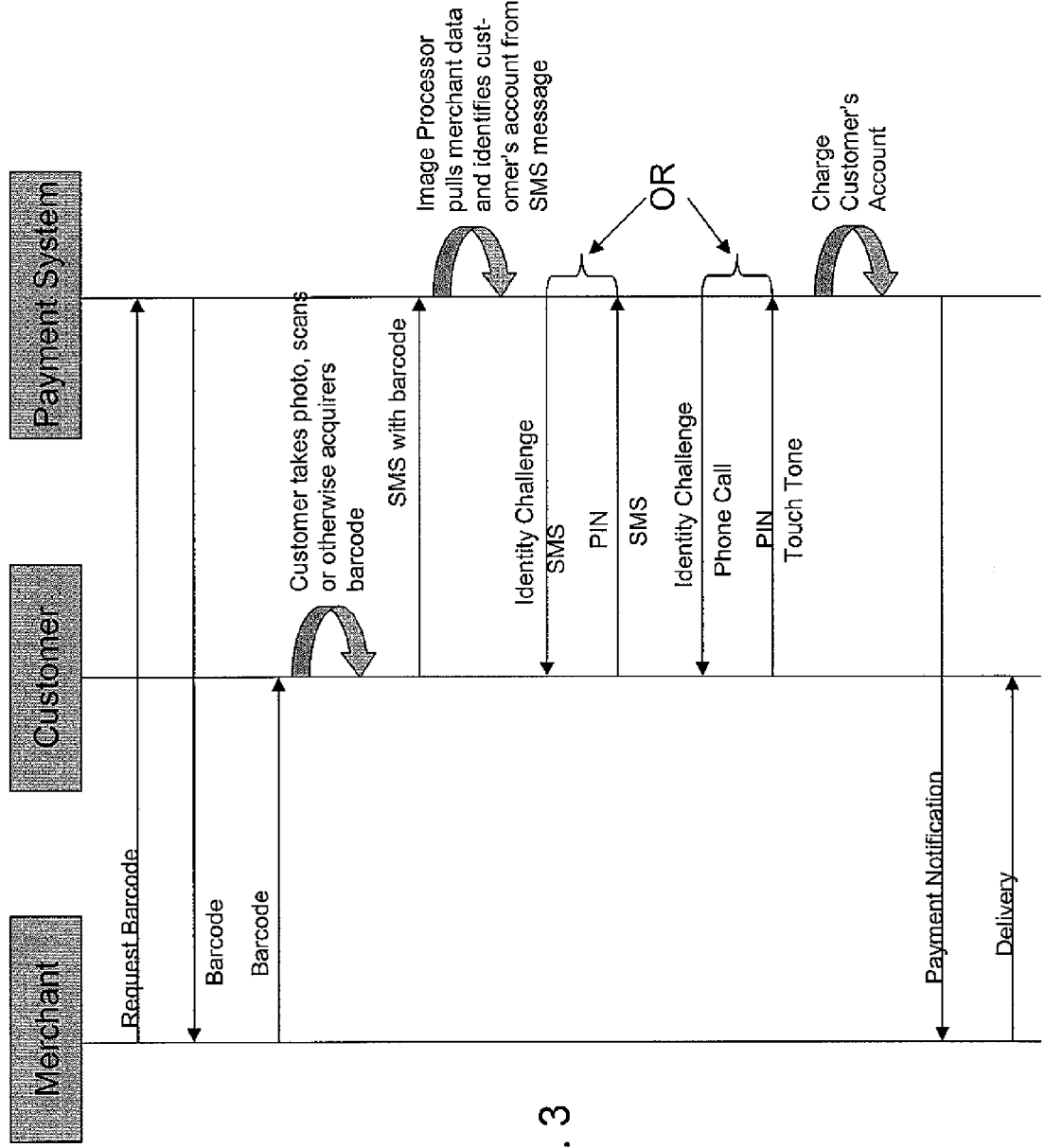
FIG. 3 is a sample flow chart illustrating one method of processing a transaction in accordance with one embodiment of the present invention.

In accordance with one method of the present invention, as illustrated by the diagram 70 in FIG. 3, the merchant can request a barcode from the payment system of the present invention, and thereafter present the barcode to the consumer. The barcode represents an item or aggregation of items (the "Item(s)") the merchant is selling, which can be a product, service or any known commercial offering. The barcode presentment may be done in real-time as the customer or mobile phone user arrives at a point of sale ("POS"), or may be done in advance and presented to the customer when the customer is ready to finalize payment. Alternately, the merchant may request the bar-code from the payment system by passing it information relevant to the transaction at hand, and receive that barcode back for presentation to the consumer.

The customer, upon arriving at an online or offline point of sale, is presented with a barcode by the merchant. The barcode may be presented via au electronic device's display screen, a web page, or any reasonably flat surface (e.g., a piece of paper, for offline transactions). The bar code conveys the merchant identity, the Item(s) identity, the summed amount of the Item(s), the amount of sales tax being charged, the amount of VAT tax being charged, the total amount of the sale, and the currency of the sale amount, and optionally, a merchant transaction or shopping cart identity/number. The barcode management component embeds the information in the bar code by encrypting it, converting the cipher text to hexadecimal values and creating the bar code to convey that hexadecimal string of characters.

The customer collects the barcode onto the customer's MCD in one of several ways. In one embodiment, the customer takes a picture to capture an image of the bar code using his mobile phone camera. In another embodiment, the customer can use an integrated scanner to scan the barcode, although such operation may require additional software in order for a common off-the-shelf MCD to operate effectively. Regardless of how the barcode is captured by the MCD, the customer can then send the digital image of the barcode to the payment engine, using SMS messaging in one embodiment of the present invention. It will be appreciated that transmitting the barcode from the customer's MCD can take place over an unsecure network without risk of compromising credit information. This conveys the bar code to the payment engine for interpretation. In lieu of a bar code, an alphanumeric Universal Product Code (UPC) may be transmitted by the MCD to the payment system, where it is received and processed by a payment system component such as the barcode management component, for example.

Figure 4:
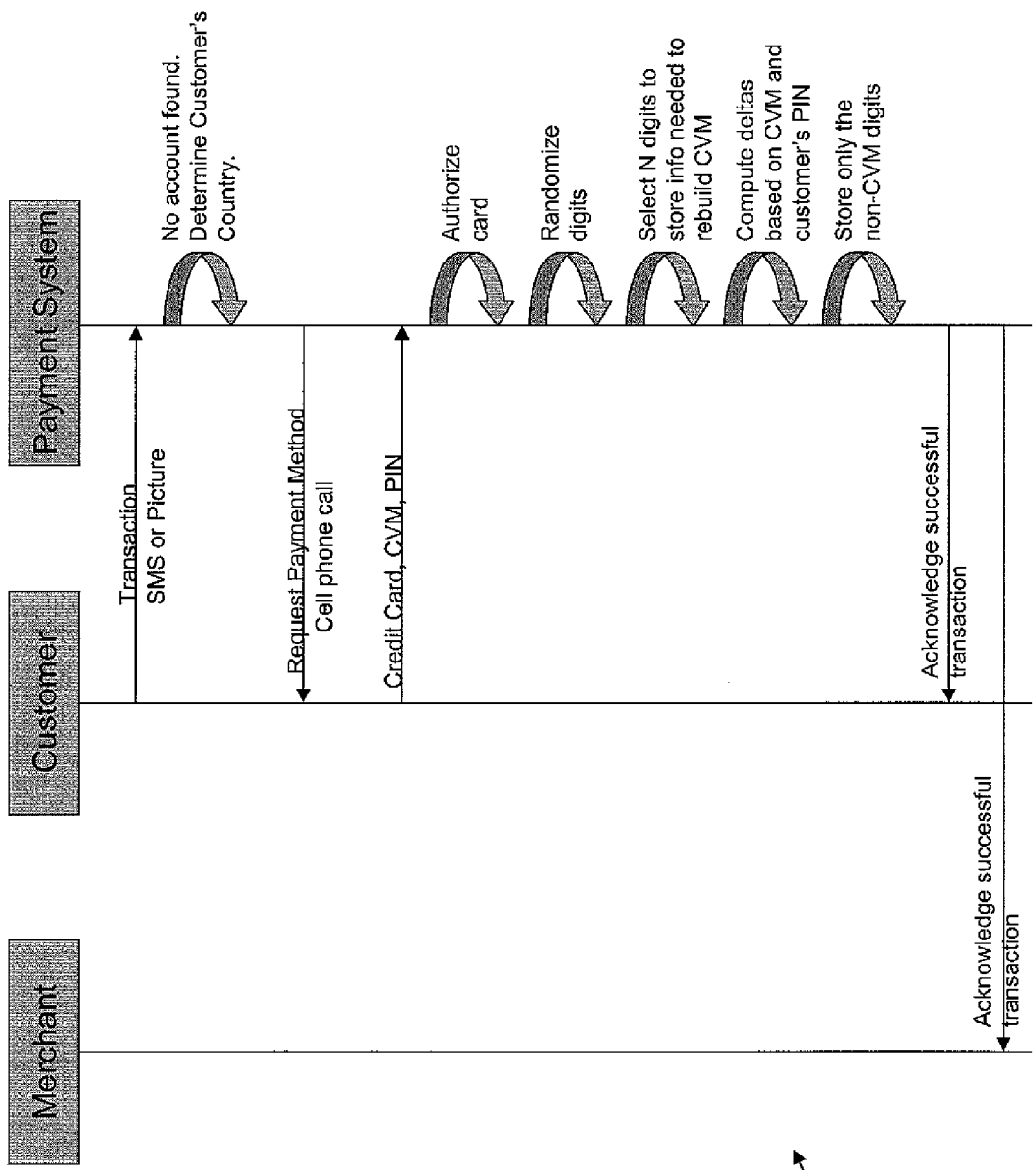
FIG. 4 is a sample flow chart illustrating one method of establishing an account for a user in accordance with one embodiment of the present invention.

If the customer does not yet have a payment system account, the account setup component 47 can operate as shown in the diagram 75 of FIG. 4. As shown in FIG. 4, upon determining that a customer sending an SMS and/or barcode has no account, the payment system calls the customer's mobile phone number and requests payment method information. In this way, the system helps the customer create and authenticate an account. The customer can send back payment card information, a CVM and PIN, for example, by voice or text. The payment system then authorizes the card, randomizes its digits, selects digits to store information needed to rebuild the CVM later, computes changes between the CVM and the PIN and stores the non-CVM digits. At this point, the payment system can then acknowledge a successful transaction to the customer and the merchant.

When the customer creates their account, they secure it with a personal identification number (PIN), which is used to authorize transactions. In one embodiment of the present invention as alluded to above, the payment engine does not store the user's PIN; rather, a non-reversible hash of the pin is stored. When the customer enters their PIN, that value is hashed by the security algorithms component and compared to the hash in storage for authentication of the PIN's correctness. The customer's payment system account may be linked to a credit card as described above, enabling real-time charges in the event the customer does not have a sufficient stored balance in their payment system account to cover the current transaction.

Referring back to FIG. 3, during a transaction, the payment system's messaging server receives the message from the customer, deciphers the account of the sender from the SMS message and, using image processing algorithms, decodes the barcode to determine the merchant making the sale, the Item(s) being purchased, the amount values, and the amount currency.

The communications component then queries the customer for authentication of the transaction. This can be accomplished via a voice call or electronic written message. The query conveys the total amount and currency of the sale and requests the customer's PIN. The PIN may be spoken or entered via the phone's dial pad. Optionally, the customer may provide the credit card's CVM at this time as described above.

Upon authorization, the payment processing component 46 of the system executes the transaction by either: (a) debiting the balance from the customer's payment system stored-value account, or (b).charging the account holder's credit card, if applicable, as described above.

If the funds are available, they are debited from the customer's account, moved to the merchant's accounts for later settlements, and a notification is communicated to the merchant. The merchant account may be configured to receive notifications via a real-time API, email, or a voice phone call to a preconfigured number, for example. Upon completion of the transaction, the purchased goods or services may be released to the customer by the merchant.

The above examples should be considered to be exemplary embodiments, and are in no way limiting of the present invention. Thus, while the description above refers to particular embodiments, it will be understood that many modifications may be made without departing from the spirit thereof.

What is claimed and desired to be secured by Letters Patent is:

1. A method for conducting an electronic transaction between a merchant and a customer, the method comprising a number of steps performed a server processor of a payment system, the number of steps including:
    establishing, by the server processor of the payment system, a customer payment account with a customer;
    ciphering, by the server processor of the payment system, the established customer payment account;
    receiving, by the server processor of the payment system, a request from a merchant for a barcode,
    wherein the request for the barcode includes information of an item offered by the merchant and a transaction amount;
    generating, by the server processor of the payment system, the requested barcode including the information of the received item offered by the merchant and the transaction amount;
    sending, by the server processor of the payment system, the requested barcode including the information of the item offered by the merchant and the transaction amount to a merchant device,
    wherein the requested barcode including the information of the item offered by the merchant and the transaction amount is received and displayed by the merchant device, and is subsequently collected by a customer mobile communication device from the merchant device and then transmitted by the customer mobile communication device to the server processor of the payment system in an SMS message;
    receiving, by the server processor of the payment system, the barcode from the customer mobile communication device;
    determining, by the server processor of the payment system, that the customer has a payment account established with the payment system;
    based on the determination that the customer has an account established with the payment system, receiving a personal identification number (PIN) from the customer mobile communication device;
    deciphering, by the server processor of the payment system, the ciphered customer payment account;
    conducting, by the server processor of the payment system, the transaction between the merchant and the customer using the deciphered customer payment account and the information from the barcode; and
    sending, by the server processor of the payment system, a payment notification to the merchant.

2. The method of claim 1 wherein the step of conducting the transaction includes sending an authorization request to an acquirer in communication with the merchant.

3. The method of claim 1 wherein the step of receiving the barcode from the customer mobile communication device includes using an unsecure network to receive the barcode.

4. The method of claim 1 further comprising, after receiving the barcode, processing the barcode, by the payment system, thereby determining that the merchant is making a sale.

5. The method of claim 1 wherein the deciphering includes processing the personal identification number according to previously established offset pairs corresponding to a payment card number related to the customer payment account.

6. The method of claim 1 wherein the barcode represents an aggregation of items that the merchant is selling.

7. The method of claim 1 wherein the barcode further represents a sales tax amount, a currency of the transaction amount, and a shopping cart identity number.

8. The method of claim 1 wherein the barcode was previously collected by a camera of the customer mobile communication device from the merchant device.

9. The method of claim 1 wherein the merchant device is a POS terminal.

10. The method of claim 1 wherein the payment system stores a non-reversible hash of the PIN, instead of the PIN.

11. The method of claim 1 wherein the customer payment account is linked to a credit card number.

12. The method of claim 1 wherein receiving the barcode from the customer mobile communication device comprises receiving the barcode in the SMS message from the mobile communication device.

13. The method of claim 1 further comprising sending a query for the personal identification number to the customer mobile communication device.

14. The method of claim 13 wherein the query includes information regarding the item and the transaction amount.

15. The method of claim 14 wherein the customer mobile communication device is a phone.

16. The method of claim 15 wherein the query is in the form of a phone call to the phone.

17. A payment system comprising:
    a server processor;
    a computer readable medium, the computer readable medium comprising code, when executed by the server processor, causes the server processor to perform the number of steps of:
    establishing a customer payment account with a customer;
    ciphering the established customer payment account;
    receiving a request from a merchant for a barcode,
    wherein the request for the barcode includes information of an item offered by the merchant and a transaction amount;
    generating the requested barcode including the information of the received item offered by the merchant and the transaction amount;
    sending the requested barcode including the information of the item offered by the merchant and the transaction amount to a merchant device,
    wherein the requested barcode including the information of the item offered by the merchant and the transaction amount is received and displayed by the merchant device, and is subsequently collected by a customer mobile communication device from the merchant device and then transmitted by the customer mobile communication device to the server processor of the payment system in an SMS message;
    receiving the barcode from the customer mobile communication device;
    determining that the customer has a payment account established with the payment system;
    based on the determination that the customer has an account established with the payment system, receiving a personal identification number (PIN) from the customer mobile communication device;
    deciphering the ciphered customer payment account;
    conducting the transaction between the merchant and the customer using the deciphered customer payment account and the information from the barcode; and
    sending a payment notification to the merchant.

* * * * *